(12) United States Patent
Goto et al.

(10) Patent No.: US 11,620,385 B2
(45) Date of Patent: Apr. 4, 2023

(54) VEHICLE CONTROL DEVICE, VEHICLE CONTROL DEVICE START-UP METHOD, AND RECORDING MEDIUM

(71) Applicant: TOYOTA JIDOSHA KABUSHIKI KAISHA, Toyota (JP)

(72) Inventors: Keita Goto, Toyota (JP); Yusuke Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 303 days.

(21) Appl. No.: 16/740,537

(22) Filed: Jan. 13, 2020

(65) Prior Publication Data

US 2020/0285749 A1 Sep. 10, 2020

(30) Foreign Application Priority Data

Mar. 5, 2019 (JP) .............................. JP2019-039703

(51) Int. Cl.
*G06F 21/57* (2013.01)
*B60W 30/192* (2012.01)

(52) U.S. Cl.
CPC ........... *G06F 21/57* (2013.01); *B60W 30/192* (2013.01); *G06F 2201/805* (2013.01); *G06F 2201/83* (2013.01)

(58) Field of Classification Search
CPC .............. G06F 21/57; G06F 2201/805; G06F 2201/83; B60W 30/192
See application file for complete search history.

(56) References Cited

U.S. PATENT DOCUMENTS

| | | | |
|---|---|---|---|
| 9,792,440 B1* | 10/2017 | Wang | H04L 63/1466 |
| 2006/0236122 A1 | 10/2006 | Field et al. | |
| 2011/0138188 A1* | 6/2011 | Lee | G06F 21/57 713/187 |
| 2014/0053165 A1* | 2/2014 | Stellwag | G06F 9/544 719/312 |
| 2015/0175170 A1* | 6/2015 | Aoki | B60W 50/023 701/45 |
| 2018/0270052 A1* | 9/2018 | Cullen | H04L 9/0827 |
| 2019/0190703 A1* | 6/2019 | Lekkas | H04L 63/00 |
| 2020/0211301 A1* | 7/2020 | Zhang | H04L 63/065 |

FOREIGN PATENT DOCUMENTS

| | | |
|---|---|---|
| CN | 106529301 A | 3/2017 |
| JP | 2008-537224 A | 9/2008 |
| JP | 2015-022521 A | 2/2015 |

* cited by examiner

Primary Examiner — Jung W Kim
Assistant Examiner — Alan Lingqian Kong
(74) Attorney, Agent, or Firm — Oliff PLC (57) ABSTRACT

A vehicle control device that verifies integrity of a program within a higher-importance region containing a start-up program; and that verifies integrity of a program within a lower-importance region in a state in which the program within the higher-importance region has been started up by the start-up program.

8 Claims, 5 Drawing Sheets

| SAFETY/SECURITY CLASSIFICATION \ START-UP TIMING | PRIOR TO ECU START-UP | | | DURING TRAVEL | | |
|---|---|---|---|---|---|---|
| | KEY | RESPONSE TO TAMPERING | VERIFICATION | KEY | RESPONSE TO TAMPERING | VERIFICATION |
| HIGHER-IMPORTANCE REGION | INDIVIDUAL KEY FOR EACH VEHICLE | DO NOT START UP | REQUIRED | INDIVIDUAL KEY FOR EACH VEHICLE | DO NOT START UP | NOT POSSIBLE |
| LOWER-IMPORTANCE REGION | COMMON ACROSS ALL ECUS | IMPLEMENT FAILSAFE | OPTIONAL | COMMON ACROSS ALL ECUS | IMPLEMENT FAILSAFE | REQUIRED |

VEHICLE CONTROL DEVICE, VEHICLE CONTROL DEVICE START-UP METHOD, AND RECORDING MEDIUM

CROSS-REFERENCE TO RELATED APPLICATION

This application is based on and claims priority under 35 USC 119 from Japanese Patent Application No. 2019-039703 filed on Mar. 5, 2019, the disclosure of which is incorporated by reference herein.

BACKGROUND

Technical Field

The present disclosure relates to a vehicle control device, a vehicle control device start-up method, and a recording medium.

Related Art

An electronic control unit (ECU) configuring a vehicle control device is a semiconductor device that operates according to programs. Thus, if a program installed in an ECU is not correct, the ECU may become unstable during normal operation.

Installation of ECU programs is performed by the vehicle manufacturer, and maintenance such as program updates is performed by the vehicle manufacturer or the vehicle dealer. However, there is a small possibility that an irregular program might be installed in error when performing such program updates. Moreover, as network-connectable vehicle configurations have appeared in recent years, issues such as ECUs being attacked by a malicious external entity and installed with fraudulent programs, or programs on the ECU being tampered with, are becoming more prevalent.

Japanese Patent Application Laid-Open (JP-A) No. 2015-022521 discloses a secure boot method in which program integrity is verified when starting up an ECU, and start-up (booting) of the ECU is only permitted once this verification has been successful.

However, an issue with the secure boot method disclosed in JP-A No. 2015-022521 is that start-up of the ECU is permitted once all programs on the ECU have been successfully verified, and so start-up of the ECU is time-consuming.

SUMMARY

An aspect of the disclosure is a vehicle control device that includes: a first verification section configured to verify integrity of a program within a higher-importance region containing a start-up program; and a second verification section configured to verify integrity of a program within a lower-importance region in a state in which the program within the higher-importance region has been started up by the start-up program.

BRIEF DESCRIPTION OF DRAWINGS

An exemplary embodiment of the present disclosure will be described in detail based on the following figures, wherein.

DETAILED DESCRIPTION

Figure 1:
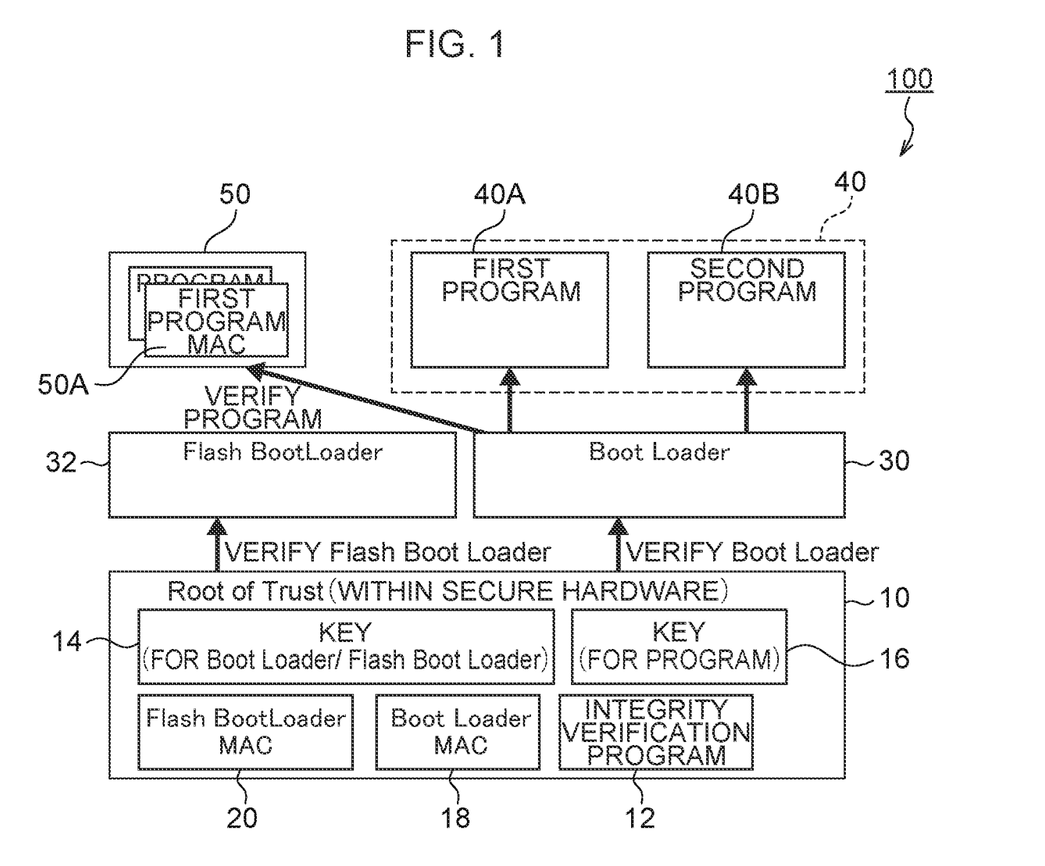
FIG. 1 is a block diagram illustrating a state during start-up of a vehicle control device according to an exemplary embodiment of the present disclosure.

Explanation follows regarding a vehicle control device 100 according to an exemplary embodiment, with reference to FIG. 1 to FIG. 5. FIG. 1 is a block diagram illustrating a state during start-up of the vehicle control device 100 according to the present exemplary embodiment.

The vehicle control device 100 illustrated in FIG. 1 is a semiconductor device (encompassing an example of a hardware processor) generally referred to as an ECU, and is installed with control programs 40 including a first program 40A and a second program 40B for controlling equipment installed in a vehicle.

A BootLoader 30 (hereafter abbreviated to "BL 30") and a Flash BootLoader 32 (hereafter abbreviated to "FBL 32") are respectively employed when starting up the vehicle control device 100. The BL 30 is a program used to load vehicle control device 100 programs held in a storage device, for example read only memory (ROM), of the vehicle control device 100 into main storage of the vehicle control device 100 during start-up of the vehicle control device 100. The FBL 32 is a program used to load vehicle control device 100 programs held in flash memory of the vehicle control device 100 into main storage of the vehicle control device 100 during start-up of the vehicle control device 100. The BL 30 and the FBL 32 are therefore the first programs to be executed during start-up of the vehicle control device 100 according to the present exemplary embodiment.

An integrity verification program 12, a key 14 employed in verification of the BL 30 and the FBL 32, a key 16 employed in verification of the control programs 40, a BootLoaderMAC 18 (hereafter abbreviated to "BLMAC 18"), and a Flash BootLoaderMAC 20 (hereafter abbreviated to "FBLMAC 20") are held in a Root of Trust 10 (hereafter abbreviated to "RoT 10"). The BLMAC 18 and the FBLMAC 20 are message authentication codes (MACs) respectively employed when authenticating the BL 30 and the FBL 32 using the key 14. The keys 14, 16 may be public keys or common keys. In the case of a public key, a hash value is employed for verification instead of the MACs, as described later. Employing common keys results in slightly faster processing than when employing public keys.

The RoT 10 that holds the integrity verification program 12, the keys 14, 16, the BLMAC 18, and the FBLMAC 20 is protected by a secure hard drive, and is configured so as to be unmodifiable after the vehicle has been shipped.

In the present exemplary embodiment, regions where the BL 30 and the FBL 32 are stored configure the regions of highest importance. When starting up or resetting the vehicle control device 100, the integrity of the BL 30 and the integrity of the FBL 32 are verified within the integrity verification program 12 prior to starting up the control programs 40. Namely, by loading and executing the integrity verification program 12, the processor of the vehicle control device 100 verifies the integrity of the BL 30 and the FBL 32 prior to starting up the control programs 40.

In the present exemplary embodiment, in cases in which the keys 14, 16 are common keys a procedure for verifying the integrity of the BL 30 is as follows.

1. Generate a MAC for the BL 30 using the key 14.
2. Compare the generated MAC to the BLMAC 18 within the RoT 10.
3. Determine the integrity of the BL 30 to be intact in cases in which the comparison results in a match.

In cases in which integrity of the BL 30 is intact, the integrity of the FBL 32 is then verified by the following procedure.

1. Generate a MAC for the FBL 32 using the key 14.
2. Compare the generated MAC to the FBLMAC 20 within the RoT 10.
3. Determine the integrity of the FBL 32 to be intact in cases in which the comparison results in a match.

In cases in which the integrity of the BL 30 and the FBL 32 is intact, the BL 30 is started up, and the integrity of the control programs 40 is verified within the BL 30 by the following procedure.

1. Generate a MAC for the first program 40A using the key 14 and the key 16.
2. Compare the generated MAC to a first program MAC 50A within a flash ROM 50.
3. Determine the integrity of the first program 40A to be intact in cases in which the comparison results in a match, and execute the first program 40A.
4. In a similar manner to 1 to 3 above, for each of the control programs 40 from the second program 40B onward, generate a MAC using the key 16, compare the generated MAC to the MAC of the corresponding control program 40 within the flash ROM 50 to verify the integrity of the control program 40, and sequentially execute control programs 40 for which the integrity is intact.

Figure 2:
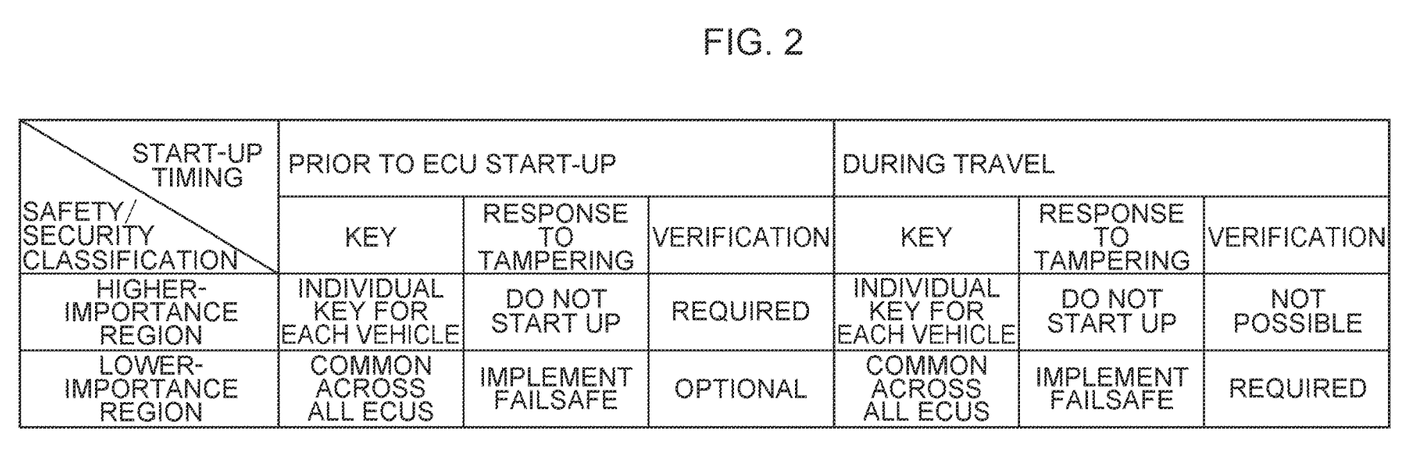
FIG. 2 is a table illustrating an example of verification region categories in an exemplary embodiment of the present disclosure.

FIG. 2 is a table illustrating an example of verification region categories. As illustrated in FIG. 2, in the vehicle control device 100 according to the present exemplary embodiment, verification regions are categorized into higher-importance regions and lower-importance regions. The higher-importance regions are regions that cannot be verified while the vehicle is traveling. In the present exemplary embodiment, the regions where the above-described BL 30 and the FBL 32 are installed correspond to higher-importance regions. In particular, the regions where the BL 30 and the FBL 32 are installed are the regions that should be verified first, and therefore need to be verified prior to starting up the vehicle control device 100 configured by the ECU.

Although regions where control programs 40 with configurations relating directly to vehicle travel, such as the vehicle engine, brakes, steering mechanism, or transmission, are installed may also be included in the higher-importance regions, increasing the number of higher-importance regions results in verification prior to start-up becoming more time-consuming.

Since the regions where the BL 30 and the FBL 32 are installed are also regions of extremely high importance in terms of security, a unique verification key 14 is prepared for each vehicle. If these regions have been tampered with, the vehicle control device 100 will not start up.

The lower-importance regions are regions that may be verified even while the vehicle is traveling. In the present exemplary embodiment, out of the above-described control programs 40, regions where programs that are not directly related to vehicle travel or safety, such as air conditioning, audio equipment, and a navigation system, are installed correspond to lower-importance regions.

The lower-importance regions do not require such tight security as the higher-importance regions, and so the key 16 employed for verification is common across all vehicle control devices 100 of the same type. In cases in which any of these regions has been tampered with, a failsafe such as not executing the program in question is implemented.

Although the lower-importance regions may be verified prior to starting up the vehicle control device 100, in the present exemplary embodiment, only the higher-importance regions are verified prior to starting up the vehicle control device 100, thereby reducing the time required for the vehicle to transition to a travel-ready state. Even though verification of the lower-importance regions is still incomplete after verification of the higher-importance regions has been completed, the vehicle is in the travel-ready state, and so in practical terms verification is executed swiftly and smoothly when starting up the vehicle control device 100.

Figure 3:
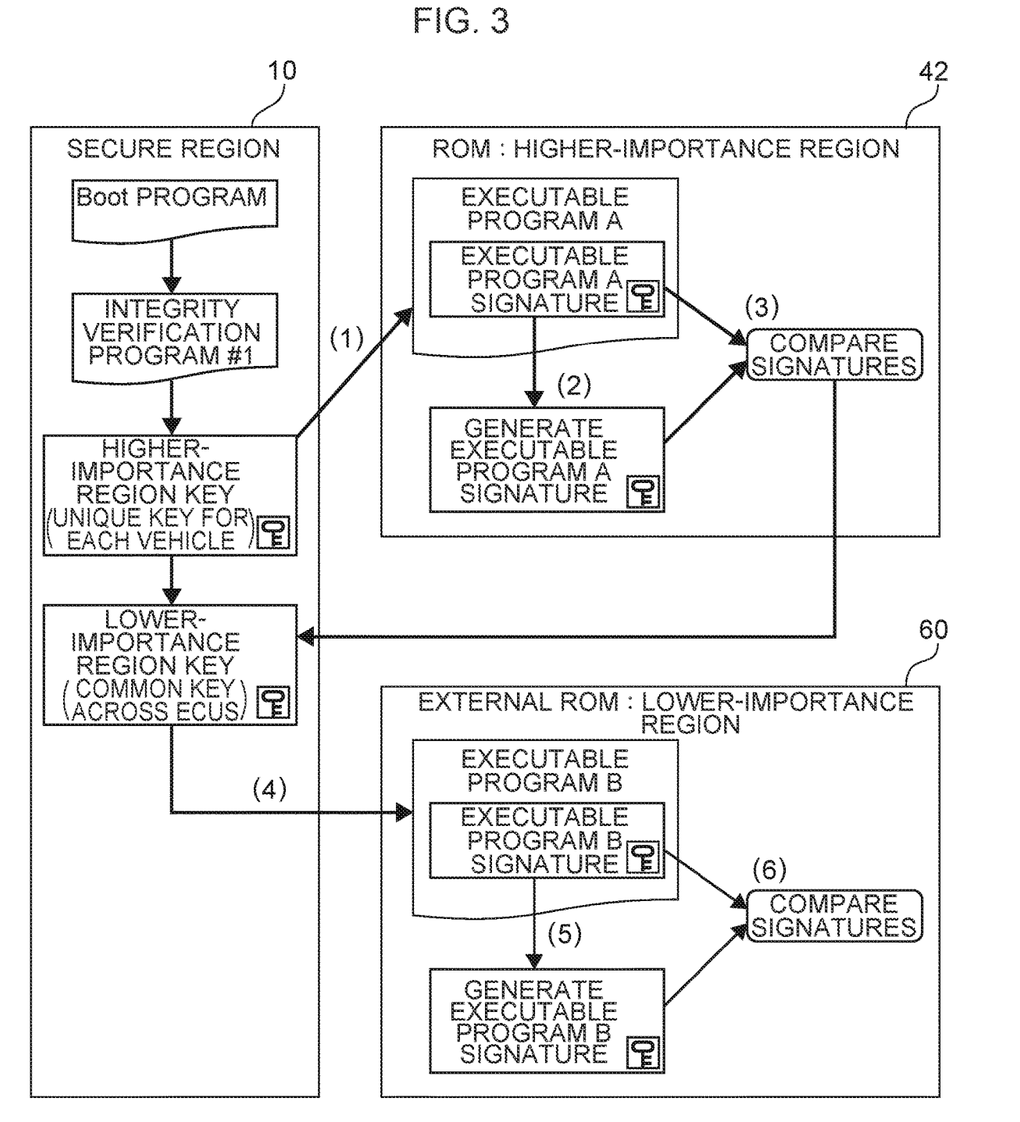
FIG. 3 is a block diagram illustrating an example of storage of keys employed in verification, and a verification route.

FIG. 3 is a block diagram illustrating an example of storage of the keys 14, 16 employed in verification, and a verification route. As illustrated in FIG. 3, in the secure region configured by the RoT 10, after the integrity of the Boot programs BL 30 and FBL 32 has been verified within the integrity verification program 12 as previously described, as illustrated by (1) in FIG. 3, the key 14 used for higher-importance regions is extracted and used to verify the integrity of an executable program A within a higher-importance region 42.

As illustrated by (2) in FIG. 3, a signature (a MAC or hash value) is generated for the executable program A based on the verification result at (1). At (3) in FIG. 3, the signature generated at (2) is compared to a signature within the executable program A calculated during development of the executable program A. In cases in which these signatures match each other, the integrity of the executable program A is determined to be intact.

As illustrated by (4) in FIG. 3, for a lower-importance region 60, the key 16 used for the lower-importance region 60 is extracted and used to verify the integrity of an executable program B within the lower-importance region 60.

As illustrated at (5) in FIG. 3, a signature is generated for the executable program B based on the verification result at (4). At (6) in FIG. 3, the signature generated at (5) is compared to a signature within the executable program B calculated during development of the executable program B. In cases in which these signatures match each other, the integrity of the executable program B is determined to be intact.

As previously described, the keys 14, 16 employed to verify integrity may be common keys or public keys. For example, in the case of a common key, the key 14 and the integrity verification program 12 within the RoT 10 are utilized to generate a MAC, this being a signature of a program within the higher-importance region 42. The generated MAC and the MAC within a verification target program are then compared. In cases in which the MACs match each other, the integrity of the verification target program is determined to be intact, and the program is started up.

In a public key system in which a program signature is encrypted by a private key, and the encrypted signature is decrypted by the public key, the integrity of a program is verified in the following manner. For example, the integrity verification program 12 or a hash value computation program within the RoT 10 is employed to generate a hash value, this being a signature of a program within the higher-importance region 42 or a lower-importance region. The public key 14 is employed to decrypt the encrypted signature of the program and obtain the hash value. The generated hash value and the decrypted hash value are then compared. In cases in which the hash values match each other, the integrity of the verification target program is determined to be intact, and the program is started up.

Figure 4:
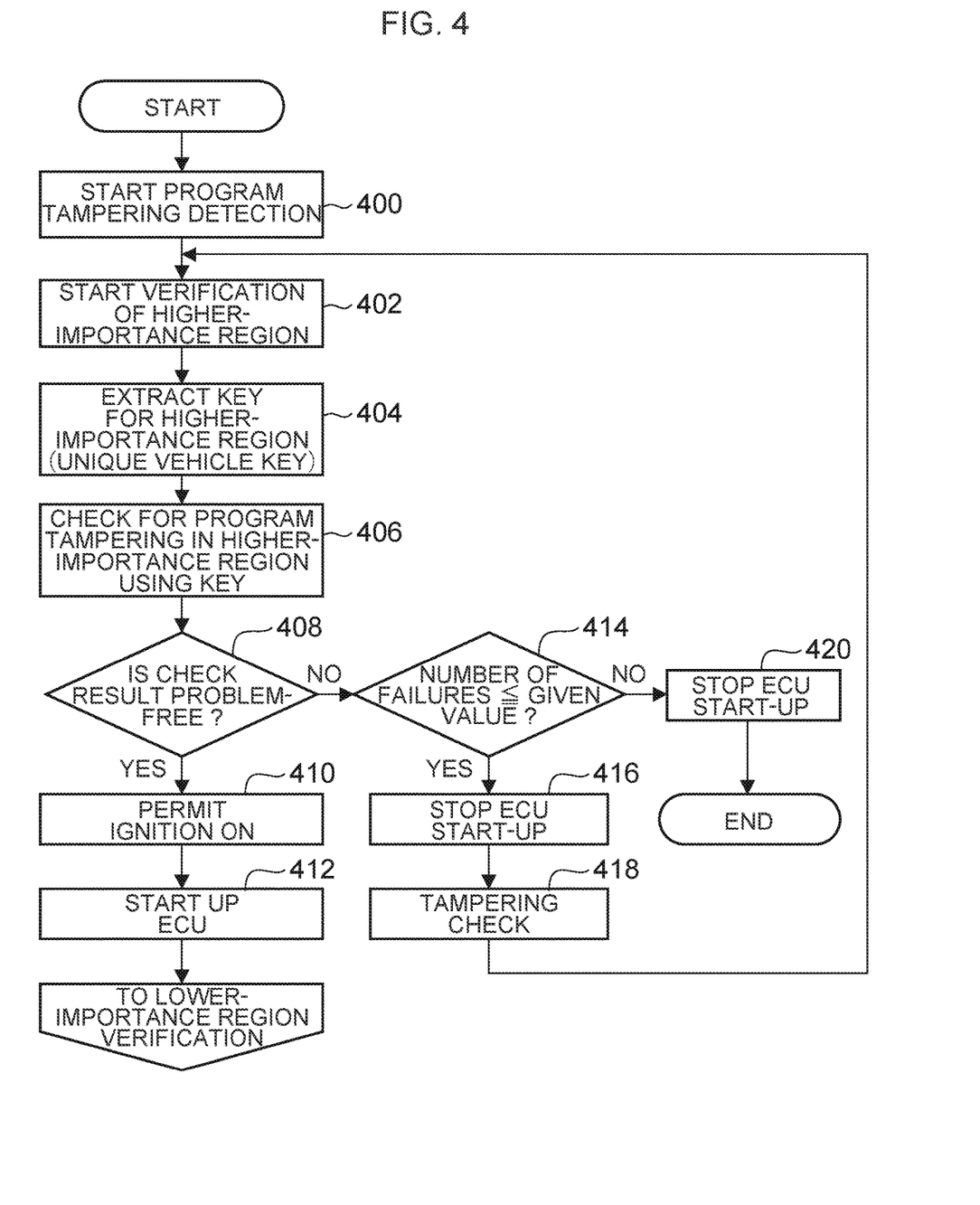
FIG. 4 is a flowchart illustrating an example of integrity verification for a higher-importance region of a vehicle control device according to an exemplary embodiment of the present disclosure.

FIG. 4 is a flowchart illustrating an example of integrity verification for the higher-importance region 42 of the vehicle control device 100 according to the present exemplary embodiment. The processing illustrated in FIG. 4 starts when the vehicle control device 100 is started up or reset.

At step 400, a program relating to program tampering detection for the higher-importance region 42 is started up. This program may for example be the integrity verification program 12.

At step 402, verification of the higher-importance region 42 starts. At step 404, the key 14 for verification of the higher-importance region 42 is extracted. As previously described, the key 14 is a unique key individually provided for each vehicle.

At step 406, the integrity of a program (software) in the higher-importance region 42 is verified using the key 14 in the manner previously described to check for program tampering.

At step 408, the validity of the check result of step 406 is determined. In cases in which the determination of step 406 has been problem-free (valid), at step 410 permission is granted to switch ON the vehicle ignition switch. At step 412, the ECU configuring the vehicle control device 100 is started up, and the processing routine transitions to integrity verification of the lower-importance regions.

In cases in which the determination of step 408 identifies a problem, at step 414, determination is made as to whether or not the number of times a problem has been identified at step 408 (the number of failures) is a given value or below. The given value varies according to the specifications of the vehicle control device 100 and so on, and may for example be two or three times.

In cases in which the number of failures is determined to be the given value or below at step 414, at step 416, start-up of the vehicle control device 100 is stopped. At step 418 a decision is made to repeat the tampering check, and the processing routine transitions to step 402.

In cases in which the number of failures exceeds the given value at step 414, at step 420, start-up of the vehicle control device 100 is stopped and processing is ended.

Figure 5:
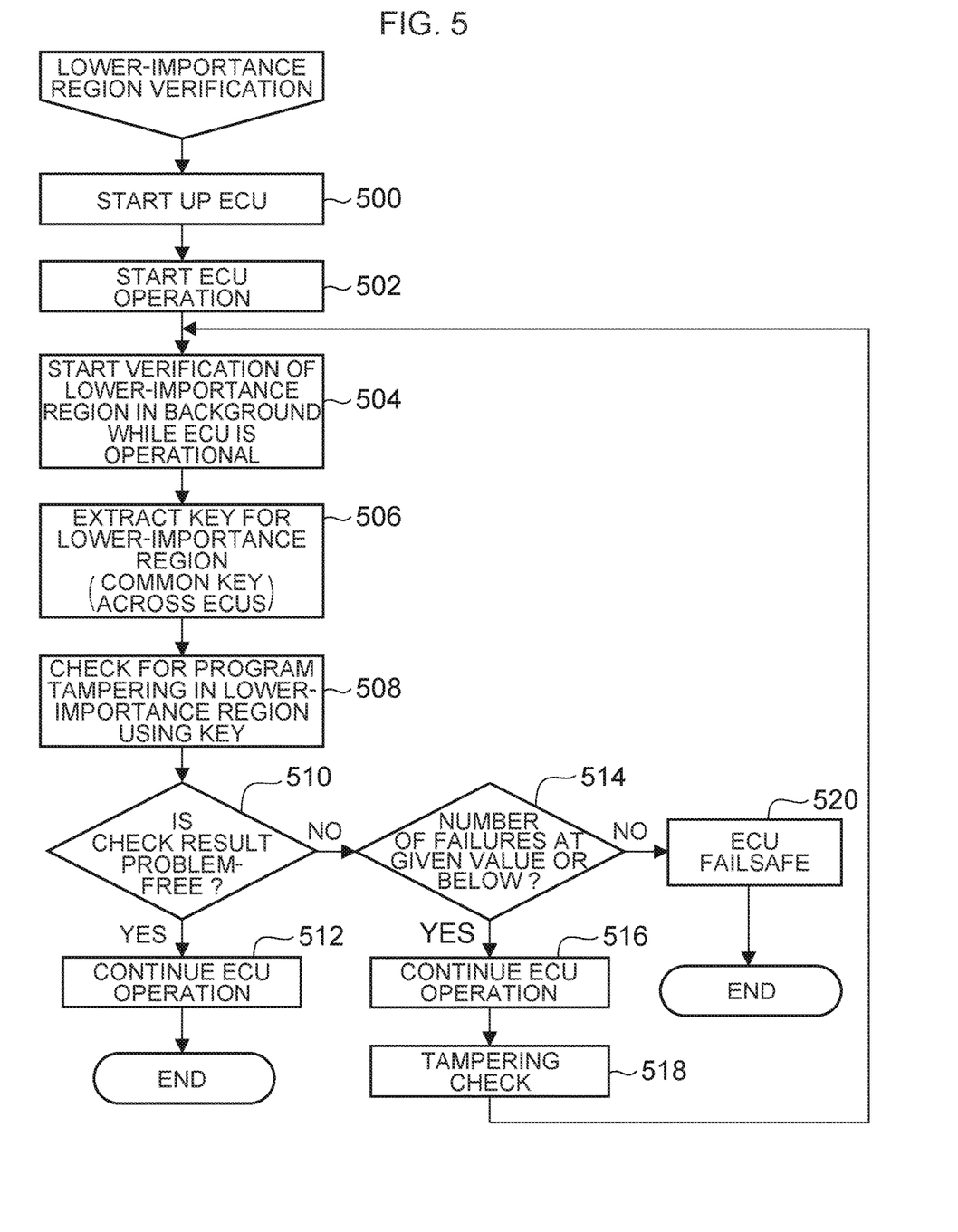
FIG. 5 is a flowchart illustrating an example of integrity verification for a lower-importance region of a vehicle control device according to an exemplary embodiment of the present disclosure.

FIG. 5 is a flowchart illustrating an example of integrity verification for the lower-importance region 60 of the vehicle control device 100 according to the present exemplary embodiment. At step 500, the vehicle control device 100 is started up according to the procedure of step 412 in FIG. 4. At step 502, the vehicle control device 100 starts operating, and the vehicle enters the travel-ready state.

At step 504, integrity verification of the lower-importance region 60 starts in the background while the vehicle control device 100 is operational.

At step 506, the key 16 for verification of the lower-importance region 60 is extracted. As previously described, the key 16 is a common key across all vehicle control devices 100 of the same type.

At step 508, the integrity of a program (software) in the lower-importance region 60 is verified using the key 16 in the manner previously described to check for program tampering.

At step 510, the validity of the check result of step 508 is determined. In cases in which the determination of step 508 has been problem-free (valid), at step 512, the vehicle control device 100 continues to operate, and the integrity verification processing of the programs of the vehicle control device 100 is ended.

In cases in which the determination of step 510 identifies a problem, at step 514, determination is made as to whether or not the number of times a problem has been identified at step 510 (the number of failures) is a given value or below. The given value varies according to the specifications of the vehicle control device 100 and so on, and may for example be two or three times.

In cases in which the number of failures is determined to be the given value or below at step 514, at step 516, the vehicle control device 100 continues to operate. At step 518, a decision is made to repeat the tampering check, and the processing routine transitions to step 504.

In cases in which the number of failures exceeds the given value at step 514, at step 520, a failsafe such as not starting up the program in question is implemented, and the integrity verification processing of the program of the vehicle control device 100 is ended.

As described above, in the vehicle control device 100 according to the present exemplary embodiment, integrity verification of programs in the higher-importance region 42 is prioritized, and integrity verification of programs in the lower-importance region 60 is performed after the vehicle control device 100 has been started up. The vehicle control device 100 is started up after verifying the higher-importance region 42, such that verification is executed swiftly during start-up.

In the present exemplary embodiment, although integrity verification of the lower-importance region 60 is still being performed in the background by the vehicle control device 100 after the vehicle control device 100 has been started up, since the vehicle is in the travel-ready state this does not cause any issues in practical terms.

In order to verify every program, tampering detection technology employing the same key for all vehicles, or technology with a low processing load such as hash functions would need to be adopted. However, such technology is vulnerable in terms of security.

In the present exemplary embodiment, a high level of security is realized by setting a unique key 14 for each vehicle for verification of the higher-importance regions, and holding this key 14 in the RoT 10, this being a secure region that cannot be modified by anyone other than the vehicle manufacturer.

The programs and so on of the present disclosure may be provided in a form held on a recording medium, under the condition that the programs are under strict management to prevent external leaks. For example, the integrity verification program 12, the keys 14, 16, the BLMAC 18, and the FBLMAC 20 stored in the RoT 10, and the respective MACs of the control programs 40 within the flash ROM 50 may be provided in a format recorded onto a non-transitory recording medium such as a compact disc read only memory (CD-ROM), a digital versatile disc read only memory (DVD-ROM), or universal serial bus (USB) memory.

Note that the BootLoader 30 and the Flash BootLoader 32 each correspond to a start-up program, the RoT 10 corresponds to a first verification section, the RoT 10 and the flash ROM 50 correspond to a second verification section, the integrity verification program 12 corresponds to an integrity verification program, the key 14 corresponds to a higher-importance region key, the BootLoaderMAC 18 and the Flash BootLoaderMAC 20 each correspond to a verification signature of a program within a higher-importance region, the key 16 corresponds to a lower-importance region key, and the first program MAC 50A corresponds to a verification signature within a lower-importance region.

The present disclosure is not limited to the above embodiment, and various other modifications may be implemented within a range not departing from the spirit of the present invention.

An object of the present disclosure is to provide a vehicle control device, a vehicle control device start-up method, and a recording medium that are capable of executing verification swiftly during start-up.

A first aspect is a vehicle control device that includes: a first verification section configured to verify integrity of a program within a higher-importance region containing a start-up program; and a second verification section configured to verify integrity of a program within a lower-importance region in a state in which the program within the higher-importance region has been started up by the start-up program.

According to the vehicle control device of the first aspect, integrity verification of the program within the higher-importance region containing the start-up program of the vehicle control device is prioritized over that of the lower-importance region.

A second aspect is the vehicle control device of the first aspect, wherein: the first verification section includes an integrity verification program, a higher-importance region key, and a verification signature of the program within the higher-importance region; and the second verification section includes a lower-importance region key, and a verification signature of the program within the lower-importance region.

According to the vehicle control device of the second aspect, the first verification section is provided with a configuration required for verifying the program within the higher-importance region, and the second verification section is provided with a configuration required for verifying the program within the lower-importance region. This enables verification of the program within the lower-importance region to be carried out separately to verification of the program within the higher-importance region.

A third aspect is the vehicle control device of the second aspect, wherein: the first verification section determines that the integrity of the program within the higher-importance region is intact in a case in which a signature of the program within the higher-importance region generated using the integrity verification program and the higher-importance region key matches the verification signature of the program within the higher-importance region.

According to the vehicle control device of the third aspect, the integrity of the program within the higher-importance region can be determined to be intact in cases in which the signature of the program within the higher-importance region generated using the higher-importance region key matches the verification signature.

A fourth aspect is the vehicle control device of the third aspect, wherein: after the first verification section has determined that the integrity of the program within the higher-importance region is intact, the second verification section determines that the integrity of the program within the lower-importance region is intact in a case in which a signature of the program within the lower-importance region generated using the lower-importance region key matches the verification signature of the program within the lower-importance region.

According to the vehicle control device of the fourth aspect, the integrity of the program within the lower-importance region can be determined to be intact in cases in which the signature of the program within the lower-importance region generated using the lower-importance region key matches the verification signature.

A fifth aspect is the vehicle control device of any of the second to the fourth aspect, wherein: the higher-importance region key is a different key for each vehicle installed with a vehicle control device; and the lower-importance region key is an identical key for all vehicle control devices of an identical type.

According to the vehicle control device of the fifth aspect, employing a different higher-importance region key for each vehicle prevents malicious use of the higher-importance region key by a third party.

A sixth aspect is a vehicle control device start-up method that includes: verifying integrity of a program within a higher-importance region containing a start-up program; and verifying integrity of a program within a lower-importance region in a state in which the program within the higher-importance region has been started up by the start-up program.

According to the vehicle control device start-up method of the sixth aspect, integrity verification of the program within the higher-importance region containing a start-up program of the vehicle control device is prioritized over that of the lower-importance region.

A seventh aspect is a non-transitory recording medium storing: an integrity verification program comprising instructions that are readable and executable by a processor to perform processing to verify integrity of a program within a higher-importance region containing a start-up program; a key for the higher-importance region; a verification signature of the program within the higher-importance region; a key for a lower-importance region to verify integrity of a program within the lower-importance region; and a verification signature of the program within the lower-importance region.

According to the recording medium of the seventh aspect, configurations required for verification of the respective programs within the higher-importance region and the lower-importance region are portable as necessary.

The vehicle control device of the first aspect enables verification to be executed swiftly during start-up by prioritizing integrity verification of the program within the higher-importance region over that of the lower-importance region.

The vehicle control device of the second aspect enables verification to be executed swiftly during start-up since verification of the program within the lower-importance region can be carried out separately to verification of the program within the higher-importance region.

The vehicle control device of the third aspect enables verification that program tampering has not occurred in cases in which the signature of the program within the higher-importance region generated using the higher-importance region key matches the verification signature.

The vehicle control device of the fourth aspect enables verification that program tampering has not occurred in cases in which the signature of the program within the lower-importance region generated using the lower-importance region key matches the verification signature.

The vehicle control device of the fifth aspect enables security to be ensured by employing a different higher-importance region key for each vehicle.

The vehicle control device start-up method of the sixth aspect enables verification to be executed swiftly during start-up by prioritizing integrity verification of the program within the higher-importance region over that of the lower-importance region.

The recording medium of the seventh aspect enables the configurations required for verification of the respective programs within the higher-importance region and the lower-importance region to be installed in a vehicle by the vehicle manufacturer.

The invention claimed is:

1. A vehicle control device that is mounted on a vehicle, the vehicle control device comprising:
   a first memory including a first region and a second region; and
   a processor coupled to the first memory, the processor being configured to:
      verify integrity of a program within the first region containing a start-up program by using a first region key, and
      verify integrity of a program within the second region by using a second region key during a state in which (i) the program within the first region has been started up by the start-up program and (ii) the vehicle is ready to travel, wherein
   the first region key is a unique key for the vehicle,
   the second region key is an identical key for the vehicle and additional vehicles other than the vehicle,
   the program within the first region is not able to be verified when the vehicle is traveling, and
   the program within the second region is able to be verified when the vehicle is traveling.

2. The vehicle control device of claim 1, further comprising
   a second memory comprising secure hardware that stores an integrity verification program, the first region key, the second region key, and a verification signature of the program within the first region;
   wherein a verification signature of the program within the second region is stored in the first memory.

3. The vehicle control device of claim 2, wherein the processor is configured to determine that the integrity of the program within the first region is intact in a case in which a signature of the program within the first region generated using the integrity verification program and the first region key matches the verification signature of the program within the first region.

4. The vehicle control device of claim 3, wherein after determining that the integrity of the program within the first region is intact, the processor is configured to determine that the integrity of the program within the second region is intact in a case in which a signature of the program within the second region generated using the second region key matches the verification signature of the program within the second region.

5. The vehicle control device of claim 1, wherein:
   the first region includes a program to start up the vehicle control device; and
   the second region includes a program that is not related to vehicle travel or safety.

6. A vehicle control device start-up method for a vehicle comprising:
   verifying integrity of a program within a first memory region containing a start-up program by using a first region key; and
   verifying integrity of a program within a second memory region by using a second region key during a state in which (i) the program within the first memory region has been started up by the start-up program and (ii) the vehicle is ready to travel wherein
   the first region key is a unique key for the vehicle,
   the second region key is an identical key for the vehicle and additional vehicles other than the vehicle,
   the program within the first region is not verified when the vehicle is traveling, and
   the program within the second region is verified when the vehicle is traveling.

7. A non-transitory computer readable recording medium storing:
   an integrity verification program for a vehicle comprising instructions that are readable and executable by a processor to perform processing to verify integrity of a program within a first memory region containing a start-up program;
   a first region key for the first memory region to verify integrity of the program within the first memory region;
   a verification signature of the program within the first memory region;
   a second region key for a second memory region to verify integrity of a program within the second memory region during a state in which (i) the program within the first memory region has been started up by the start-up program and (ii) the vehicle is ready to travel; and
   a verification signature of the program within the second region, wherein
   the first region key is a unique key for the vehicle, and
   the second region key is an identical key for the vehicle and additional vehicles other than the vehicle,
   the program within the first region is not verified when the vehicle is traveling, and
   the program within the second region is verified when the vehicle is traveling.

8. The vehicle control device of claim 1, wherein the program within the second region is not related to vehicle travel or vehicle safety.

* * * * *